Dec. 10, 1968          P. M. THAYER                3,415,379
                SELECTIVE SEWAGE TREATMENT PLANTS
Filed Sept. 18, 1967                              5 Sheets-Sheet 1

INVENTOR
PAUL M. THAYER

BY

*Morrill & Morrill*

ATTORNEYS

Dec. 10, 1968  P. M. THAYER  3,415,379
SELECTIVE SEWAGE TREATMENT PLANTS
Filed Sept. 18, 1967  5 Sheets-Sheet 2

INVENTOR
PAUL M. THAYER

BY

ATTORNEYS

Dec. 10, 1968 P. M. THAYER 3,415,379
SELECTIVE SEWAGE TREATMENT PLANTS
Filed Sept. 18, 1967 5 Sheets-Sheet 3

INVENTOR
PAUL M. THAYER

BY
*Morsell & Morsell*
ATTORNEYS

Dec. 10, 1968     P. M. THAYER     3,415,379
SELECTIVE SEWAGE TREATMENT PLANTS
Filed Sept. 18, 1967     5 Sheets-Sheet 4

INVENTOR
PAUL M. THAYER

BY

*Morell & Morell*

ATTORNEYS

Dec. 10, 1968 P. M. THAYER 3,415,379
SELECTIVE SEWAGE TREATMENT PLANTS
Filed Sept. 18, 1967 5 Sheets-Sheet 5

INVENTOR
PAUL M. THAYER

BY
ATTORNEYS

United States Patent Office 3,415,379
Patented Dec. 10, 1968

3,415,379
SELECTIVE SEWAGE TREATMENT PLANTS
Paul M. Thayer, Milwaukee, Wis., assignor to Water Pollution Control Corp., Milwaukee, Wis., a corporation of Wisconsin
Continuation-in-part of application Ser. No. 488,704, Sept. 20, 1965. This application Sept. 18, 1967, Ser. No. 675,733
8 Claims. (Cl. 210—195)

ABSTRACT OF THE DISCLOSURE

A selective sewage treatment plant having a surrounding circular tank with partitions dividing the tank into U-shaped aeration zones constituting a first tank portion, and into a second tank portion usable either to increase the capacity of the first tank portion, if an extended aeration process is being carried out in the plant, or as an aerobic digester if a pre-aeration activated sludge process, a step aeration activated sludge process, or a contact stabilization process is being carried out. There is means selectively directing raw sewage into said second tank portion if an extended aeration process is being employed, or into selected locations in said first tank portion if one of the other processes is being employed. There is a settling tank within and surrounded by the surrounding tank, and there is gate means for selectively permitting flow from said second tank portion into one end of the first tank portion when the plant is being used for extended aeration, there being means adjacent the other end of the first tank portion for conducting mixed liquor into the settling tank, and there is means for removing sludge from the settling tank and flow divider means for delivering it to said second tank portion and/or to the first tank in predetermined portions dependent upon the process being used.

---

This application is a continuation-in-part of my co-pending application Ser. No. 488,704 filed Sept. 20, 1965 and now abandoned.

Background of the invention

*Field of the invention.*—The present invention has to do with that class of sewage treatment plant which is suitable for use in a relatively small municipality or other place having similar problems. Inasmuch as most municipalities have constant growth pattern, a sewage treatment plant that might be suitable and adequate at the time of installation, may be either inadequate or inefficient in operation as the community grows.

*Description of the prior art.*—In relatively small communities it has been common practice to initially install a plant capable of carrying out an extended aeration process, which plant might be suitable for the handling of an average daily flow of 16,000 gallons, for example. There are, however, other accepted processes which can handle a larger daily flow, such as a pre-aeration activated sludge process, which is suitable for a substantially larger daily flow; a step aeration activated sludge process suitable for a still larger flow; and a contact stabilization process which can handle a still larger daily flow.

Once a plant has been installed in a community a change to a different process is expensive and, also, might involve an awkward temporary shutdown during such change.

Summary of the invention

It is a general object of the present invention to provide an improved selective sewage treatment plant which can be readily converted, by simple manipulations, from one process to another to suit the particular requirements and to best match the daily inflow as the community grows.

A more specific object of the invention is to provide a selective sewage treatment plant which can be converted by simple manipulations from an extended aeration process (either extreme low flow, low flow, or average flow) to a pre-aeration activated sludge process, to a step aeration activated sludge process, or to a contact stabilization process.

A further object of the present invention is to provide a selective sewage treatment plant as above described which can be furnished in a compact design wherein there is a central settling tank, and wherein there are aeration and digester tanks located around the outer periphery of the central settling tank, the design being such that it can be manufactured in a plurality of sections within required size limitations for transportation, and then sent to a specified location and assembled in the field.

A further object of the invention is to provide a selective sewage treatment plant as above described which embodies a novel digested sludge concentration hopper which may be maintained in inoperative open condition when the plant is being used for an extended aeration process, and which may be readily put into operative condition, by simple manipulations, for use with a pre-aeration activated sludge process, with a step aeration activated sludge process, or with a contact stabilization process.

A further object of the invention is to provide a novel means including a flow divider for delivering sludge from the bottom of the settling tank into the digester tank and reaeration zone in selected proportions.

With the above and other objects in view, the invention consists of the improved selective sewage treatment plant, and all of its parts and combinations, as set forth in the claims, and all equivalents thereof.

Brief description of the drawings

In the accompanying drawings, illustrating one complete embodiment of the preferred form of the invention, in which the same reference numerals designate the same parts in all of the views.

*Description of the preferred embodiments*

Referring more particularly to the drawings, the numeral 20 designates an outer tank of metal or other suitable material having a bottom 21. Disposed concentrically within the outer tank is an inner settling tank 22 which may be octagonal as shown and which may have a lower interior converging portion 23. Disposed centrally above the portion 23 is an open-bottomed stilling well 24, there being a mixed liquor conduit 25 having a receiver in the form of a funnel 26 leading from a location externally of the settling tank to the stilling well, the funnel having upper and lower walls, having opposed side walls, one of which may be formed by the partition 38, and having an open outer end to receive material. As an important feature the upper sheet or wall 26′ of the funnel 26 is angled outwardly and upwardly to release entrained air to the aeration tank and prevent its being carried into the settling tank 22.

An overflow trough 27 is located interiorly from the upper portion of the settling tank wall, there being adjustable weirs 28 having upper edge notches 29. The weirs are connected to the upstanding flange of the trough 27 by bolts 30 extending through slots 31 in the weirs whereby the weirs may be raised or lowered for adjustment purposes to control the overflow. The overflow effluent from the settling tank is directed by the trough 27 or launder to an outlet pipe 32 which leads to a point of discharge, such as a stream.

A sludge return air lift pipe 33 has its lower end spaced somewhat above the bottom 21 and receives air from a compressed air line 34. This air lift is adapted to return sludge from the bottom of the settling tank to one of the other tanks for reprocessing purposes. In this connection the uppear end of the air lift pipe 33 is connected by a T with a branch 35 leading in one direction and with a branch 36 leading in an opposite direction. A cap 37 may be placed on the end of either the pipe 35 or 36 depending upon the process being employed, or a suitable valve control may be used instead of the cap.

The outer tank has radial partitions 38 and 39 and a partial separator 40, there being a passageway 41 between the inner end of the separator and the settling tank which provides constant communication between the tank portions on the two sides of the separator 40, said tank portions forming a two-section first tank portion in which the arcuate tank portion which extends between the partial separator 40 and the partition 38 forms an aeration zone and the section which extends between the partial separator 40 and the partition 39 forms a reaeration zone. The arcuate tank portion between the partitions 38 and 39 forms an aerobic digester and is termed a second tank portion.

Raw sewage is admitted through an inlet 42 which connects with a raw sewage distributing channel 43, the latter being on the inner side of the wall of the outer tank near the upper portion thereof. Opposite the inlet 42 is an opening 44. A stop plate 45 may be removably bolted over the opening 44 to close the latter during use of the plant for certain types of processes. In addition, upright gates 46 and 47 may be provided for detachably closing the distribution channel on each side of the inlet. One of these gates may be bolted to the depending flange 48 of FIG. 10, and the other to the depending flange 49 on the opposite side, depending upon requirements. On one side the distributing channel 43 leads through an opening 50 in the radial partition 38, there being an opening 51 intermediate the length of said distributing channel section which is adapted to be removably closed by a stop plate 52.

Figures 9, 10, 11, 12, 13, 14, 15:
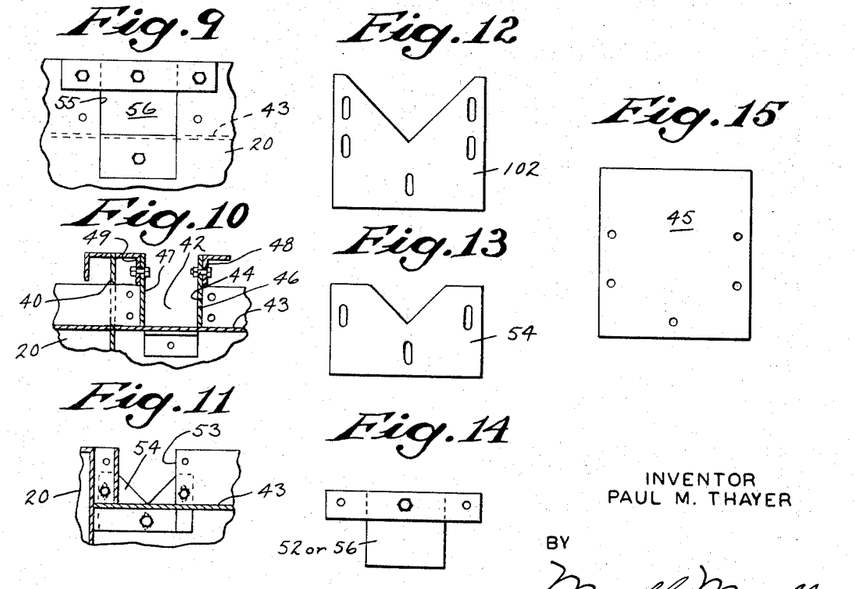
FIG. 9 is a fragmentary detail view showing one of the distribution channel ports as indicated by the line 9—9 of FIG. 1.
FIG. 10 is a fragmentary sectional view taken on line 10—10 of FIG. 1.
FIG. 11 is a fragmentary detail view looking as indicated by the line 11—11 of FIG. 1.
FIGS. 12 and 13 are separate views of weirs.
FIGS. 14 and 15 are separate views of stop plates.

In the other direction from the inlet opening 42 the distributing trough 43 extends for approximately ninety degrees, where there is an end opening 53 adapted to be controlled by an adjustable weir 54 (see FIG. 11). Intermediate the length of this distribution channel section is an opening 55 which is adapted to be closed by a stop plate 56 which is removably bolted in place. Actually one of the stop plates of FIG. 14 will suffice as the openings 51 and 55 do not have to be closed at the same time. In lieu of the stop plates 56, 45 and 52 there may be adjustable weirs, such as shown in FIGS. 13 and 12, depending upon the process being carried out.

The partition 39 is provided with an opening 57 which is adapted to be removably closed by a gate 58 which may be removably slid into position.

Figure 2:
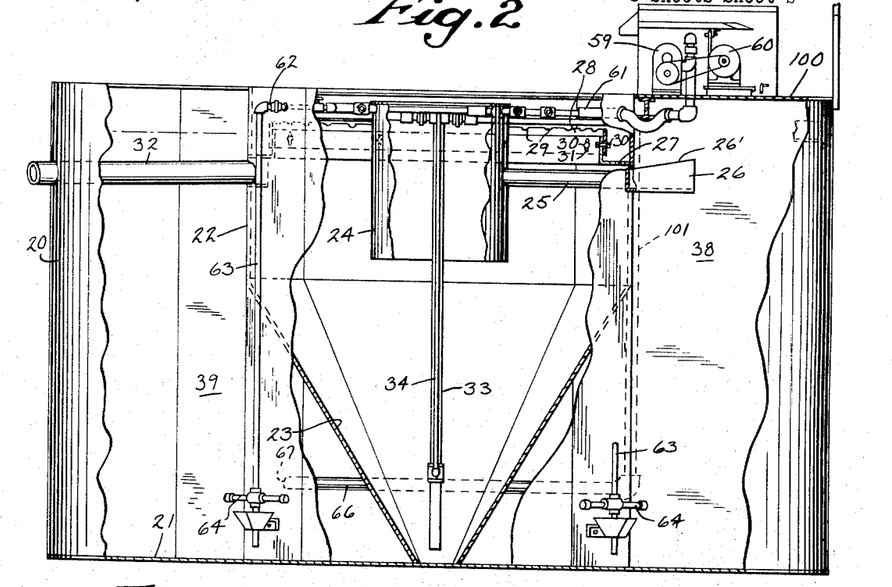
FIG. 2 is a front elevational view thereof with parts broken away and shown in section.

Suitably mounted on a platform 100 covering part of the tank, as shown in FIG. 2, is a blower 59 which may be suitably driven by a motor 60. The outer part of the blower is connected with a header 61 having horizontal branch lines 62 leading to positions over the outer tank. From each branch line is a depending vertical line 63 connecting with an air diffuser unit 64 near the bottom. Air conduits for the air lifts 33 and 101 may also connect with the header 61. The air supply to each diffuser may be suitably controlled by a valve 65.

Extending transversely, preferably through the void between the settling tank and the converging portion 33, near the bottom is a waste sludge withdrawal conduit 66 having an open intake end 67 for removing excess sludge near the entrance end of the reaeration zone and for returning it to the aerobic digester at 68.

An important element in the operation of the selective plant is the digested sludge concentration hopper indicated generally by the numeral 69, as shown in FIGS. 1, 3, 4 and 5. When the plant is being used in connection with a process having a separate aerobic digester zone, the overflow of clarified digester supernatant will enter the hopper inlet opening 70 (shown in FIG. 1) spaced a suitable distance below the top of the sludge concentration hopper, said inlet being baffled by a baffle 70′. This hopper has sloping walls 71 and 72 to provide a downwardly converging cross section. The hopper has an opening 104 for overflow of clarified digester supernatant, which opening also provides communication between the tank 21 and the tank on the other side of the partition 39 when an extended aeration process is being carried out, said opening being controlled by an adjustable weir plate 103, the latter being bolted in position. The weir may be raised or lowered when the bolts are loosened due to the use of slotted openings for the bolts, as illustrated (see FIG. 4). When the sludge concentration hopper 69 is in operative condition, sludge settles out near the bottom and may be withdrawn through an outlet opening 74 controlled by a suitable valve 75.

At the bottom of the hopper is a horizontal door 76 pivoted as at 77. An operating rod 78 projects upwardly from the door and has its lower end pivoted thereto as at 79. The upper end of the operating rod is adjustably connected to a link 80 pivoted as at 81 to a handle 82. When the handle is raised upwardly to the dot-and-dash line position of FIG. 5, the door will be locked in closed position due to the fact that the pivot 81 for the link 80 has been moved past center. When the handle is in the full line position of FIG. 5, the door is wide open. The door may also be maintained in partially-opened position depending upon requirements.

OPERATION

When operated for extended aeration, a plant of this type which is of practical transportable size, may be required to handle an average daily flow of 16,000 gallons. This same plant can be converted to increased capacities by conversion to alternative processes as follows:

|  | Activated sludge, gal. per day |
| --- | --- |
| Pre-aeration | 28,000 |
| Step-aeration | 32,000 |
| Contact Stabilization | 40,000 |

Extended aeration process

The return sludge air lift device 33 should be adjusted to match a flow approximating the average daily flow. This is accomplished by adjusting the needle valve 83 for the air line 34. The admission of diffused air should be uniform throughout the entire aeration tank with all branch valves wide open. The weirs 28 in the settling tank should be adjusted to give a uniform overflow into the trough 27 during normal operation.

The bottom door 76 of the digested sludge concentration hopper should be wide open permitting circulation through the hopper, thus rendering it inoperative. In addition, the gate 58 controlling the opening in the partition 39 may be removed to permit free flow through the opening 57, or the weir 103 may be adjusted to permit such flow through opening 104.

Figures 1, 3, 4, 5:
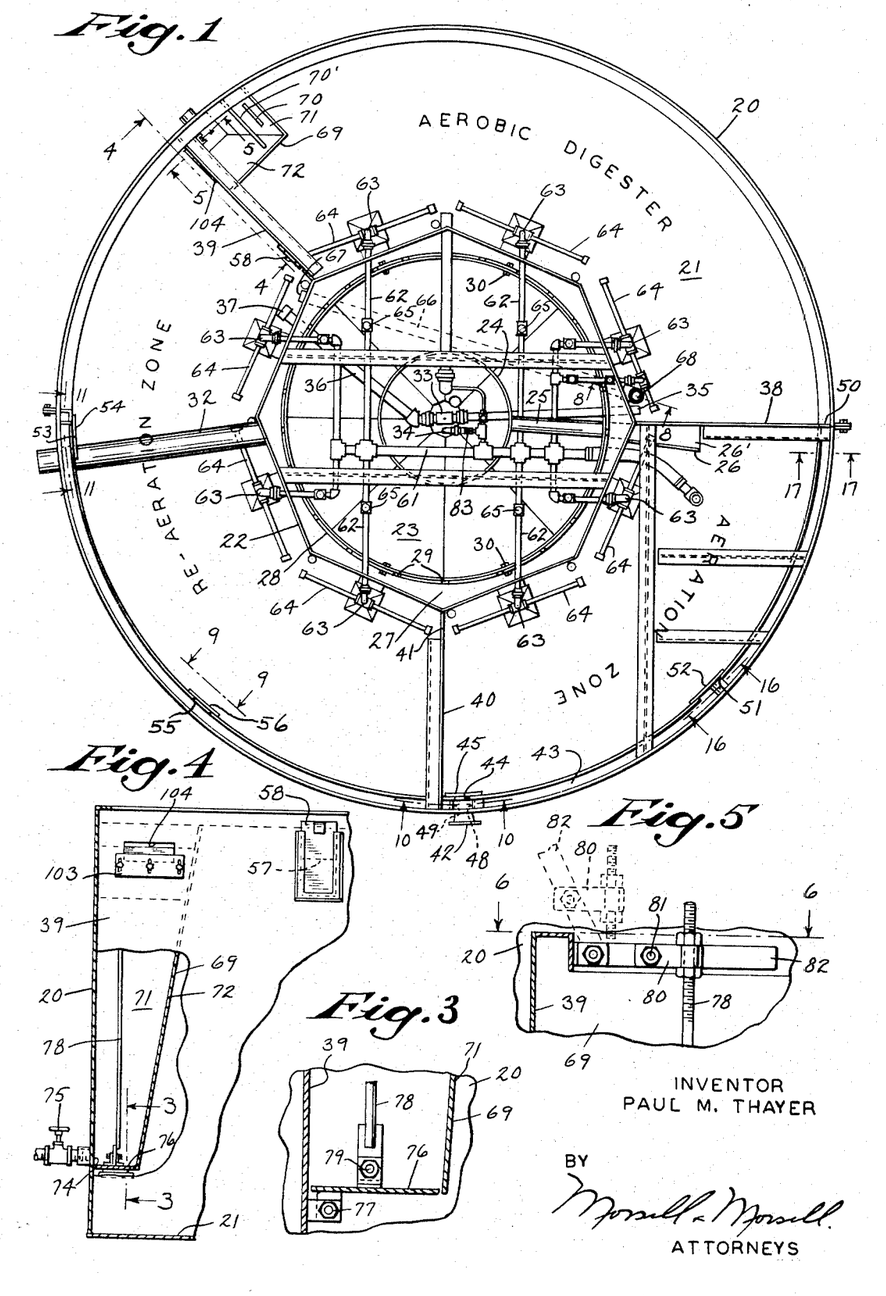
FIG. 1 is a plan view of the treatment plant with top platforms removed.
FIG. 3 is a fragmentary sectional view taken approximately on the line 3—3 of FIG. 4, showing the lower portion of the sludge concentration hopper.
FIG. 4 is a fragmentary sectional view taken on the line 4—4 of FIG. 1.
FIG. 5 is a fragmentary sectional view taken on the line 5—5 of FIG. 1.
Figures 6, 7, 8, 16, 17:
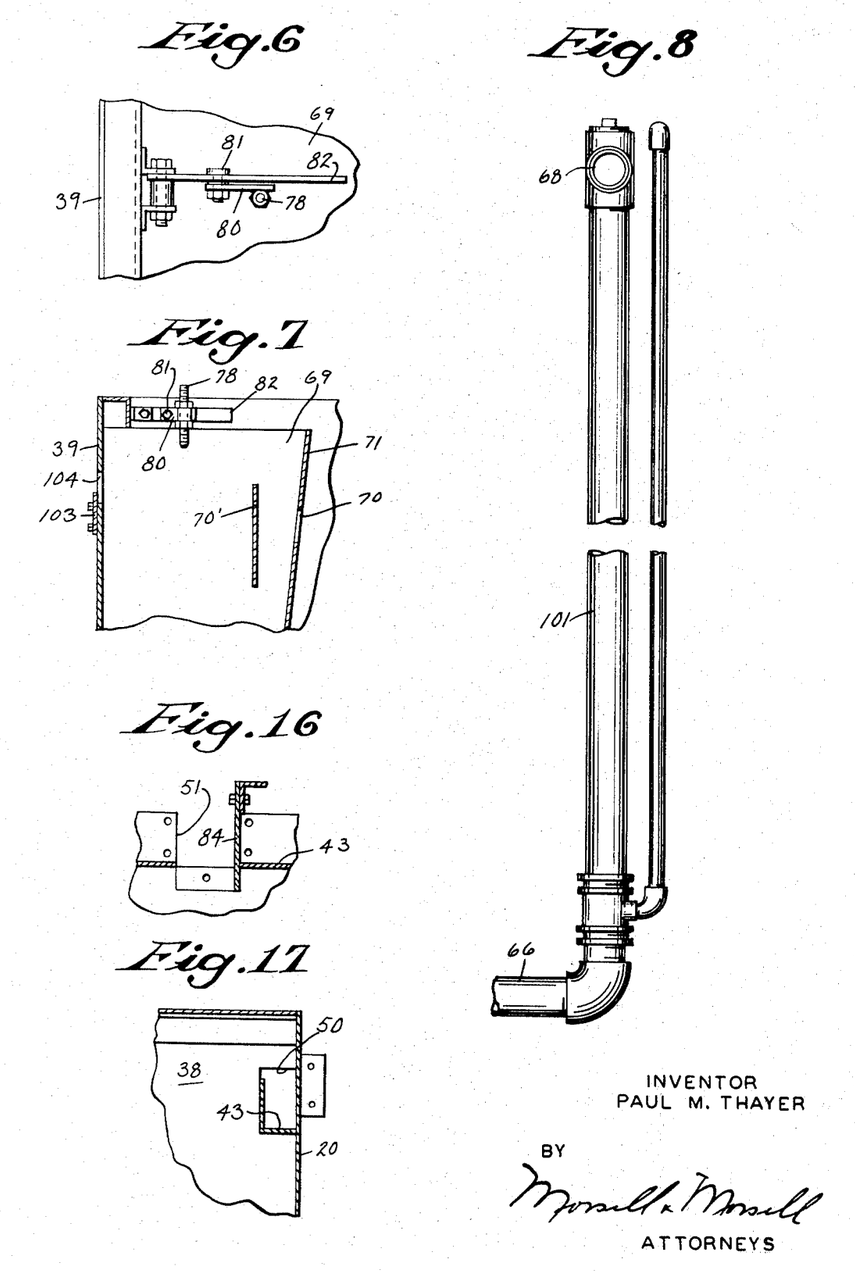
FIG. 6 is a fragmentary top view looking as indicated by the line 6—6 of FIG. 5.
FIG. 7 is a fragmentary sectional view through the upper portion of the sludge hopper.
FIG. 8 is a fragmentary sectional view taken on line 8—8 of FIG. 1 to show the waste sludge airlift.
FIG. 16 is a fragmentary detail view taken on line 16—16 of FIG. 1.
FIG. 17 is a fragmentary sectional view taken on the line 17—17 of FIG. 1.

Referring now to the raw sewage distributing channel 43, this should be placed in condition for the extended aeration operation by removing the gate 46 and by having the gate 47 on the left side of the inlet in place to prevent inflowing raw sewage from flowing to the left (referring to FIG. 1). In addition, the stop plate 45 should be covering the opening 44, the stop plate 52 should be in place over the opening 51, and the plate 84 (FIG. 16) should be removed. Raw sewage from the inlet 42 will then flow to the right in the distributing channel 43, and will emerge from the opening 50 which extends through the partition 38. The sewage can then circulate around, passing through the opening 57 or 104 in the partition 39 and being aerated by the diffusers. In this type of operation, the outer tank, throughout its entire circumference, acts as an aerator, treating the sewage and getting rid of the solids at the same time in the same tank. Mixed liquor will enter the flared end 26 of the mixed liquor conduit 25 which leads into the stilling well 24. The sloping to plate 26' will permit entrained air in the mixed liquor to separate out and return to the aeration tank rather than be carried into the stilling well where it would cause undue turbulence, thereby reducing settling efficiency. Sludge which settles out in the bottom of the settling tank portion 23 will be returned by means of air lift 33 through the pipe 35, the pipe 36 being capped by the cap 37 when the system is being used for extended aeration.

Any entrained air in the mixed liquor will be relased in the stilling well, which will bring scum to the surface. The overflow from the settling tanks will flow over the adjustable weir 28 into the trough 27 and out through the outlet pipe 32 where it may be directed into a stream or other location.

Pre-aeration activated sludge process

If the requirements of the municipality are such that pre-aeration is desired, this same plant can be readily converted for this purpose. When so used, the cap 37 is placed on the pipe 35 so that the return sludge is directed out of the line 36. In this process, as well as in step aeration and contact stabilization, it is desired to have a separate aerobic digester compartment or zone. This is accomplished by closing the gate 58 for the opening 57 in the partition 39. At the raw sewage inlet 42 the stop gate 47, which prevented flow to the left from the distribution channel, is removed and the stop gate 46 is inserted to prevent flow to the right. In addition, the stop plate 56 is in closing position and the stop plate 45 is in closing position. Also, the weir 54 is adjusted on the opening 53. As an important part of this operation the door 76 at the bottom of the digested sludge concentration hopper may be manipulated for control purposes. By having such door it is possible to control the sludge concentration in the digester to suit conditions. If there are sufficient solids in the digester then the door 76 is closed completely to permit further concentration of the solids in the bottom of the hopper with removal as desired through the outlet 74 under control of the valve 75. When sludge is being pumped out then, after all of the concentrated sludge in the hopper has been removed, it is possible to open the door 76 a desired amount and continue pumping sludge from the lower portion of the digester tank.

With this operation the entering raw sewage is directed toward the left in the channel 43 and is discharged from the opening 53. It will then pass through the re-aeration zone, through the passageway 41 into the aeration zone, and then into the inlet 26 of the mixed liquor conduit which leads to the stilling well. The sludge is returned from the bottom of the settling tank through the pipes 33 and 36 into the entrance end of the re-aeration zone for use in reprocessing or may be returned through a flow divider as hereinafter discussed in connection with FIGS. 18-23. The concentration of solids in the aeration zones is controlled by wasting excess sludge to the aerobic digester zone through the bottom conduit 66, in the form of invention of FIG. 1, by means of the waste sludge air lift 101 which discharges into the aerobic digester zone at 68. The quantity of sludge wasted is governed by the rate of flow controlled through use of a suitable valve on the air supply line to the air lift, and the duration of flow may be controlled by a suitable timer-operated solenoid valve on the air supply line to the air lift. The overflow weir plate 103 controlling the overflow opening 104 of the sludge concentration hopper (see FIG. 14) is adjusted to control the water depth in the aerobic digester so that the aeration pattern in both the aeration zones and the aerobic digester will be equal. With the gate 76 closed at the bottom of the sludge concentration hopper, the valve 75 may be opened periodically to withdraw settled out waste sludge.

Step aeration activated sludge process

In step aeration the same procedure is followed as in pre-aeration except that, in step aeration, the raw sewage is admitted to the aeration zones through a plurality of openings simultaneously. For step aeration, the gate 58 in the partition 39 is closed, the gates 46 and 47 controlling flow through the distribution channel on each side of the inlet opening are removed, the gate 84 is closed, and the stop plates 56, 45 and 52 are removed. An adjustable weir 54 is put in position to control the flow from openings 53, 55 and 51 and an adjustable weir 102, as shown in FIG. 12, is put in place over opening 44. In addition, it is desirable to use a suitable flow divider within the inlet 42 to insure proper distribution. In addition, the gate at the bottom of the digested sludge concentration hopper may be manipulated for control purposes as heretofore explained and the overflow weir plate 103 of FIG. 4 is adjusted to control overflow of clarified digester supernatant. In this process the aerobic digester operates as a separate tank and the process is otherwise the same as in the pre-aeration process.

Contact stabilization

Contact stabilization, which is capable of handling the largest number of gallons per day, also uses the separate aerobic digester zone. This is accomplished by closing the gate 58 in the partition 39 and by employing the door 76 at the bottom of the sludge concentration hopper 69 in the manner heretofore explained. In addition, the plate 46 is put in position at the left of the raw sewage inlet 42 to prevent flow to the left through the distribution channel 43 and the gate 47 is put in place on the other side to prevent flow to the right through the distribution channel. Stop plate 45 is removed to provide an opening near the head end of the aeration zone into the interior of the tank, no weir plate being used at the opening. In the form of FIG. 1, the sludge return is also through the line 36, the cap 37 being on the line 35.

The functioning of the aerobic digester is the same for the pre-aeration activated sludge process, for the step-aeration activated sludge process, and for the contact stabilization process. In all three, the overflow weir plate 103 from the digested sludge concentration hopper is adjusted to control the water depth in the aerobic digester so that the aeration pattern in both the aeration zones and the aerobic digester will be equal. Also, concentration of solids in the aeration zones is controlled by wasting excess sludge to the aerobic digester through the line 66 by means of the waste sludge air lift 101, in the form of FIGS. 1 and 8, or by use of the flow divider in the form of invention of FIGS. 18–23. The quantity of sludge wasted is governed by the rate of flow, which may be controlled by the needle valve on the air supply line for the latter air lift.

The maximum efficiency of operation of a contact stabilization plant or a plant for a pre-aeration or step-aeration activated sludge process can only be obtained by careful control of the rate of settled sludge return. For best operating efficiency the rate of sludge return should be equal to about 25% of the average daily sewage flow. Excess sludge must be wasted to the aerobic digester to maintain the optimum concentration of solids in the treatment process after this has been determined by conventional testing methods. The rate of waste sludge discharged ranges between 1%–2% of the average daily sewage flow. This same volume of clarified digester supernatant may be returned through the adjustable opening 104 to the head end of the re-aeration zone for further processing. The operation of any of the aeration processes serves to concentrate phosphates and nitrates in the sludge produced by such aeration process, thereby largely removing these materials from the processed and clarified sewage. The sludge wasted to the digester releases these phosphates and nitrates to the liquid during the process of aerobic digestion.

These nitrates and phosphates can be removed from the system more efficiently and cheaply by treating the clarified supernatant from the digested sludge concentration hopper through use of structure as hereinafter described. Thus the system concentrates phosphates so they can be more easily and economically treated.

When the bottom of the sludge concentration hopper is closed, solids entering the hopper will settle out in more concentrated form so that they can be drawn off through the outlet 74 by manipulation of the valve 75. If desired, in certain situations, the bottom 76 of the hopper can be partially opened, in which case there will be a clarification of the supernatant and a return of some concentrated sludge to the aerobic digester. There are many situations where this latter partially-open operation would be desirable.

Figure 18:
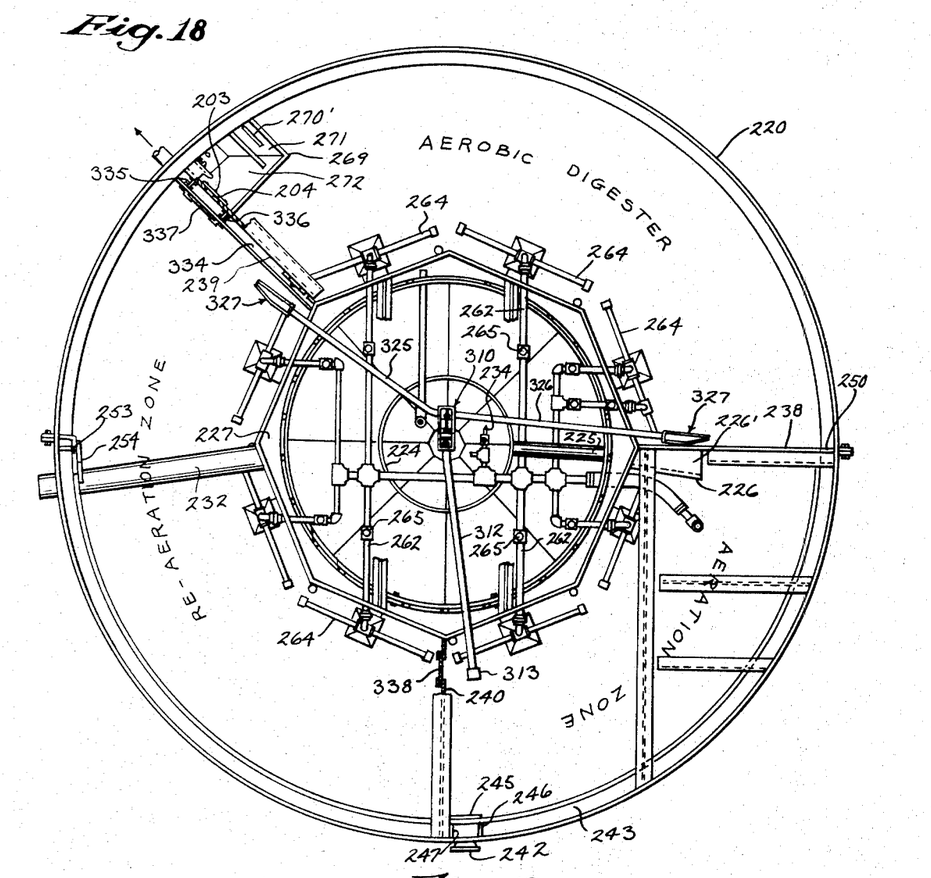
FIG. 18 is a view similar to FIG. 1, showing a modification.

FIGS. 18–23 illustrate a modified form of the invention. In FIG. 18 most of the parts are the same as those of FIG. 1 and, where this is true, the same reference numerals are used preceded by the digit "2." These common parts will not be redescribed.

Flow divider

Figure 19:
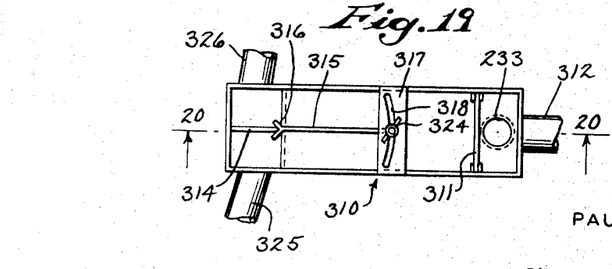
FIG. 19 is a plan view of a portion of the flow divider.
Figure 20:
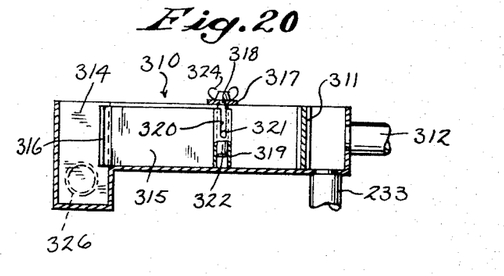
FIG. 20 is a sectional view taken on the line 20—20 of FIG. 19.

In the form of the invention of FIG. 1 the sludge may be returned from the bottom of the settling tank through the pipes 33 and 36 into the entrance end of the re-aeration zone for use in reprocessing. Instead of this arrangement, in the modification of FIG. 18 the sludge is returned from the bottom of the settling tank through the pipe 233 to a flow divider 310 (see FIG. 19). The receiving portion of this flow divider comprises a rectangular box which is open at the top. The pipe 233 enters the bottom of the box at one end thereof, as shown in FIGS. 19 and 20, and this end may be partitioned off by a removable gate 311, when it is desired to direct the sludge back into the aeration zone through a pipe 312 during the carrying out of an extended aeration process. When an activated sludge process is being carried out, the partition 311 is removed and a cap 313 is placed on the end of the pipe 312, as is shown in FIG. 18.

Figure 21:
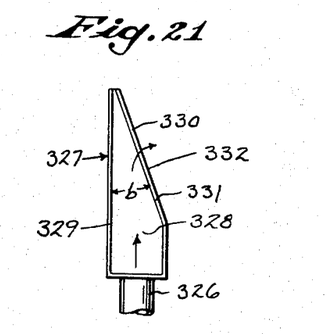
FIG. 21 is a plan view of one of the flow divider terminal portions.
Figure 22:
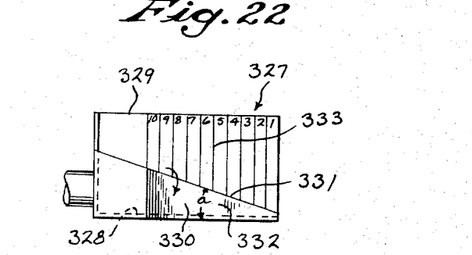
FIG. 22 is an elevational view looking at one side of the flow divider of FIG. 21.
Figure 23:
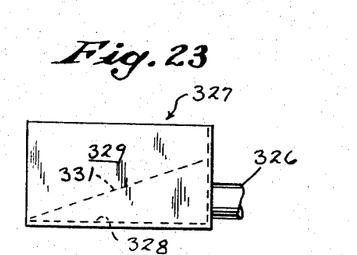
FIG. 23 is an elevational view looking at the other side of the flow divider of FIG. 21.

At the opposite end of the box from the intake 233 is a fixed flow divider plate 314. A swingable blade 315 has a V-shaped inner end 316 which pivots around an edge of the fixed plate partition 314. The opposite end of the swingable blade 315 swings below a top strip 317 having a slot 318 therein. This end of the swingable blade has a cylindrical sleeve 319 (see FIG. 20) with oppositely-disposed upright slots 320 for receiving lugs 321 projecting from the side of a pin 322. This pin is adapted to be dropped into the upper end of the sleeve 319 before the blade is assembled, and a bolt 323 having a winged upper end 324 is adapted to be passed through the slot 318 in the strip 317 and threaded into a tapped hole in the upper end of the pin 322 to lock the blade in a selected position of swingable movement. Thus by swinging the blade 315 the flow through pipes 325 and 326 may be proportioned as desired for a purpose to be hereinafter explaining in greater detail. On the ends of the pipes 325 and 326 are measuring devices 327 in the form of open topped outfall channels. These devices are the same in construction so only one will be described. Such measuring device is illustrated in FIGS. 21, 22 and 23. Each measuring device has a bottom 328, a rectangular back wall 329, which is perpendicular to the bottom, and a special inclined weir 330 having a downwardly-inclined upper edge 331. In addition, the outer portion of the weir 330 is angled toward the back wall as at 332 and there is a small end gap to prevent clogging. While not essential, it is preferred that angle (a) FIG. 22 be equal to angle (b) FIG. 21.

The purpose of the flow divider arrangement illustrated in FIGS. 18–23 is to control the concentration of solids in the aeration zone through the pipe 325 by delivering a certain proportion of the sludge, depending upon the position of the flow dividing blade 315, through the pipe 326 to the digester tank. The sludge delivered to the pipes 325 and 326 will have its turbulence reduced due to the distance of travel in said pipes, and delivered into the measuring devices 327. As the flow through either leg builds up, the height of the flow in the channel of FIG. 22 will increase, causing the flow to spill over at a point farther from the end. The acute angle will make it easy to read the point of spillover, while it is overflowing the upper edge 331 of the front wall. By having markings 333 on the back wall 329, as shown in FIG. 22, the place in the length of the upper edge 331 where the spillover is taking place can be visually lined up with one of the markings for purposes of measuring the rate of flow. These markings can be coordinated with a calibration curve which will make it easy to determine the flow in each leg.

There must be some means of avoiding too much turbulence so that the scale can be read properly. In the illustrated form of the invention this is provided by the length of the pipes 325–326. In constructions where such long pipes are not needed it may be desirable to utilize baffles in the measuring devices 327 adjacent the inlet openings thereto.

Figure 24:
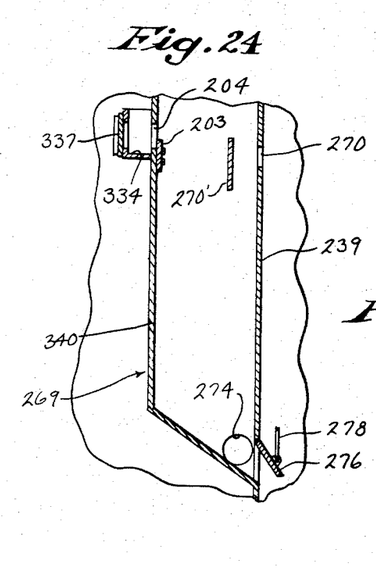
FIG. 24 is a fragmentary vertical sectional view showing a modified sludge concentration hopper.
Figure 25:
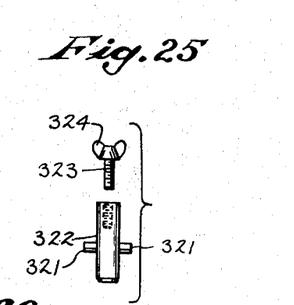
FIG. 25 is an exploded view showing the pin for the removable blade removed, together with the bolt which is threaded into the pin to lock the blade in a selected position of adjustment.
Figure 26:
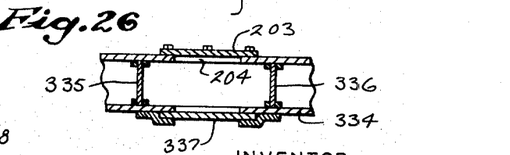
FIG. 26 is a fragmentary plan view showing a portion of the trough of FIG. 18, together with the removable gates.

In the form of the invention of FIG. 18 the gate 58 of FIG. 1 is not employed. This is because the opening 204 which is controlled by the weir 203 (corresponding to the opening 103 and gate 104 illustrated in FIG. 4) may be adjusted to carry out the same function when using an extended aeration process. In the form of the invention of FIG. 18, the opening 204 leading from the sludge concentration hopper leads into a trough 334 (this trough is also illustrated in the modification of FIG. 24). Where an extended aeration process is being carried out, slidable gates 335 and 336 are left in place and a gate 337 is removed. This allows the mixed liquor to enter the re-aeration zone.

When carrying out an activated sludge process there are several alternative types of operation possible. The supernatant may be directed into the re-aeration zone in the same manner heretofore described in connection with the mixed liquor. By having gates 335 and 337 closed, the supernatant is delivered into the launder trough 227 to join with the effluent from the settling tank. On the other hand, if separate treatment of the nitrates and phosphates outside of the tank is desired, this can be accomplished by closing the gate 336 and by opening the gate 335. Then all of the supernatant from the sludge concentration hopper is directed outside of the tank to outside treatment mechanism.

In the modification of FIG. 18 the wall 240, instead of having a gap which is open at all times such as the gap 41 of FIG. 1, will extend all the way across the aeration zone and will have a slidable gate 338 which can be opened or closed.

When carrying out an extended aeration process with normal flow this gate is opened. It is also possible, with this arrangement, to carry out a low flow extended aeration process, utilizing the aeration zone and the re-aeration zone, by leaving the gate 338 open. When thus operating, the gate 245 is closed, as well as the gate to the right, which corresponds to the gate 46 of FIG. 10. The raw sewage will then flow to the left and will emerge from opening 253 over weir 254. When operating in this manner, the partition 311 is removed from the flow divider of FIG. 19, the cap 313 is in place on the pipe 312, and the blade 315 is adjusted completely over to the right to divert all flow of sludge through the pipe 325 into the re-aeration zone.

It is also possible to operate an extended aeration process on extreme low flow by utilizing only one tank. When this process is being carried out the plate 245 is removed and raw sewage is admitted directly into the aeration zone tank, the plates 46 and 47 of FIG. 10 being in place. In addition, the gate 338 in the partition 240 is closed, as is the gate 311 in the flow divider. This causes all returned sludge from the settling tank to be returned to the aeration zone through pipe 312, the cap 13 being removed. Thus the process operates with only one tank, i.e. the aeration zone, the digester tank portion and the re-aeration zones being blocked out. In a sewage plant where there is no interest in possible use of extreme low flow the pipe 312 can be omitted, as well as the gate 311.

FIG. 24 shows a modified arrangement for the digested sludge concentration hopper. Here the hopper, instead of being within the aerobic digester tank as in FIGS. 1 and 18, is on the opposite side of the wall 239, the opening 270 through which clarified digester supernatant enters the hopper being in the wall 239 and said opening being baffled by a baffle 270' just like the baffle 70 of the form of the invention of FIG. 1. In the modification of FIG. 24 the trough 334, as described in connection with FIG. 18, is placed on the wall 340 as illustrated in FIG. 24, whereas in the form of the invention of FIGS. 1 and 18, said opening is in the wall 39 or 239. In the modification of FIG. 24 the bottom door 276 is in the partition wall 239 so that it leads into the digester tank. It can be controlled by operating mechanism 278 similar to that described in connection with FIG. 1. There is also an overflow opening 274 for removal of sludge which may be valve controlled in the same manner illustrated in FIG. 4.

From the above it is apparent that the improved sewage treatment plant may be converted from one position to another by simple manipulations, insertions, or removals of the gates, weirs, and hopper bottom, and by making whatever adjustments are required for the operation of the particular process selected.

Various changes and modifications may be made without departing from the spirit of the invention, and all of such changes are contemplated as may come within the scope of the claims.

What I claim is:

1. A selective aeration type sewage treatment plant comprising a first tank portion having an aeration section and a re-aeration section, means providing for communication between said two sections, an optionally usable second tank portion, aeration means in both sections of said first tank portion and in said second tank portion, a settling tank having outlet means for clarified effluent, a raw sewage conduit having an inlet, first directing means for directing raw sewage from said raw sewage conduit into one section of said first tank portion, alternative second directing means communicable with said raw sewage conduit for directing said raw sewage into the other section of said first tank portion, third directing means communicable with said raw sewage conduit for directing said raw sewage into said second tank portion when the latter is being used to increase the capacity for an extended aeration process, means providing for optional communication between said second tank portion and said first tank portion whereby all communication between said first tank portion and said second tank portion may be cut off if desired when the second tank portion is being used as an aerobic digester, means for withdrawing mixed liquor from one section of said first tank portion to said settling tank, means providing a flow path for sludge from the settling tank to the first tank portion, means providing a flow path for sludge from the settling tank to said second tank portion, means for withdrawing sludge from a lower portion of the settling tank, means for controlling the return of sludge from said withdrawing means of the settling tank through said flow path means to the first and second tank portions in predetermined proportions and providing for optionally cutting off flow of sludge to the second tank portion entirely while allowing flow of sludge to the first tank portion, and also providing for optionally cutting off flow of sludge to the first tank portion entirely while allowing flow of sludge to the second tank section.

2. A selective aeration type sewage treatment plant as defined in claim 1 in which the controlling means for returning sludge from the settling tank to said first and second tank portions includes means for optionally returning said sludge from said settling tank only to that section of the first tank portion which has the means for withdrawing the mixed liquor, there being means for shutting off communication between the two sections of first said tank portion.

3. A selective aeration type sewage treatment plant as set forth in claim 2 in which the controlling means for controlling the flow of sludge from the settling tank to the first and second tank portions includes a flow divider, and in which the flow divider includes means for returning sludge only to one of the sections of said first tank portion when the plant is being operated with only said one section for extreme low flow operation.

4. A selective aeration type sewage treatment plant as set forth in claim 1 in which said raw sewage directing means includes a channel adjacent a wall of the first tank portion, said channel having an opening communicating with one section of said first tank portion, another opening communicating with the other section of said first tank portion, and another opening communicating with said second tank portion, there being flow control means for selectively directing raw sewage out of one or more of said openings.

5. A selective aeration type sewage treatment plant as set forth in claim 4 in which the second tank portion is an aerobic digester when needed and in which the first and second tank portions surround the settling tank and in which an end of the channel has optional communication with the second tank portion.

6. A selective aeration type sewage treatment plant comprising a first tank portion, an optionally usable second tank portion, aeration means in said first and second tank portions, a settling tank having outlet means for clarified effluent, a raw sewage conduit having an inlet, a first directing means for directing said raw sewage from said raw sewage conduit into said first tank portion, alternative second directing means communicable with said raw sewage conduit for directing said raw sewage into said second tank portion when the latter is being used, means providing for communication between said second tank portion and said first tank portion, means for withdrawing mixed liquor from said first tank portion to said settling tank, controlled means for returning sludge from said settling tank to said second tank portion, controlled means for returning sludge from said settling tank to said first tank portion, and digested sludge concentration hopper having an inlet opening for receiving liquid from said second tank portion, said hopper having a sludge outlet and having a bottom opening communicating with said second tank portion and having a door controlling said bottom opening, and said hopper having an effluent outlet.

7. A selective aeration type sewage treatment plant comprising a first tank portion, an optionally usable second tank portion, aeration means in said first and second tank portions, a settling tank, a raw sewage conduit having an inlet, a first directing means for directing said raw sewage from said raw sewage conduit into said first tank portion, alternative second directing means communicable with said raw sewage conduit for directing said raw sewage into said second tank portion when the latter is being used, means providing for communication between said second tank portion and said first tank portion whereby all of said tank portions may be coupled together for an extended aeration process, means for withdrawing mixed liquor from said first tank portion to said settling tank, means providing a flow path for sludge from the settling tank to the first tank portion, means providing a flow path for sludge from the settling tank to said second tank portion, sludge withdrawing means in the settling tank, and a flow divider between said sludge withdrawing means and said first and second flow path means for controlling the return of sludge from the settling tank to the first tank portion and second tank portion in predetermined proportions and providing for optionally cutting off the flow to the second tank portion entirely and thereby direct flow to the first tank portion.

8. In a sewage treatment plant having an aerobic digester tank with aeration means, means for feeding sludge to said digester tank, a digested sludge concentration hopper having an inlet opening for receiving liquid from said digester tank and having an overflow opening for supernatant, having a lower opening communicating with said digester tank below the level of liquid therein, and a closure controlling said lower opening whereby sludge may be accumulated in said hopper when the closure is closed and recirculated to the digester tank when open, there being discharge means for removing excess sludge from said hopper.

References Cited

UNITED STATES PATENTS

| | | | |
|---|---|---|---|
| 325,449 | 9/1885 | Schueler | 137—612 |
| 1,099,396 | 6/1914 | Rothwell | 210—197 X |
| 1,772,518 | 8/1930 | Pardini | 73—215 X |
| 1,825,103 | 9/1931 | Stacey | 137—611 X |
| 1,893,623 | 1/1933 | Imhoff | 210—195 |
| 2,027,370 | 1/1936 | Currie | 210—220 X |
| 2,901,114 | 8/1959 | Smith, et al. | 210—256 X |
| 3,301,050 | 1/1967 | McNulty | 73—215 |
| 3,312,346 | 4/1967 | Walker | 210—195 |
| 3,339,741 | 9/1967 | Bernard, et al. | 210—220 X |

REUBEN FRIEDMAN, *Primary Examiner.*

J. DeCESARE, *Assistant Examiner.*

U.S. Cl. X.R.

210—220, 256